Figure 1:
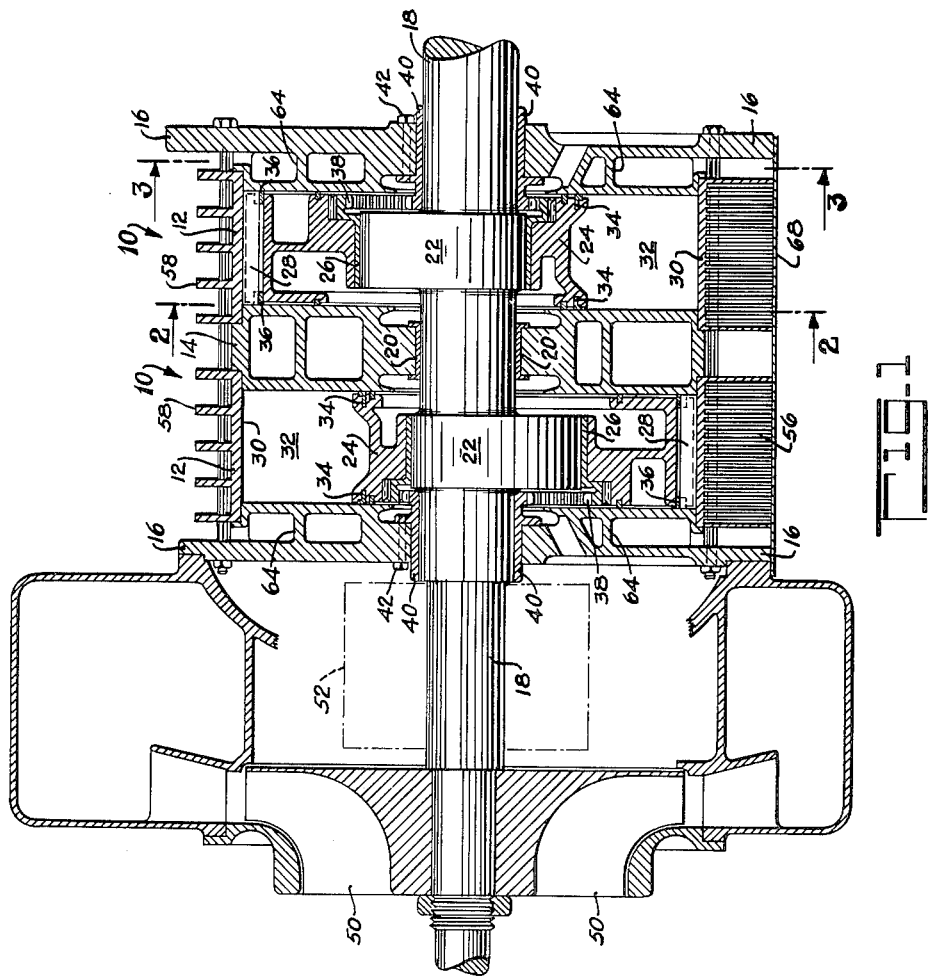

July 27, 1965

C. JONES 3,196,855

AIR COOLING SYSTEM FOR ROTARY COMBUSTION ENGINE

Filed Dec. 9, 1964

5 Sheets-Sheet 1

INVENTOR.
CHARLES JONES

BY *Julian Falk*

ATTORNEY

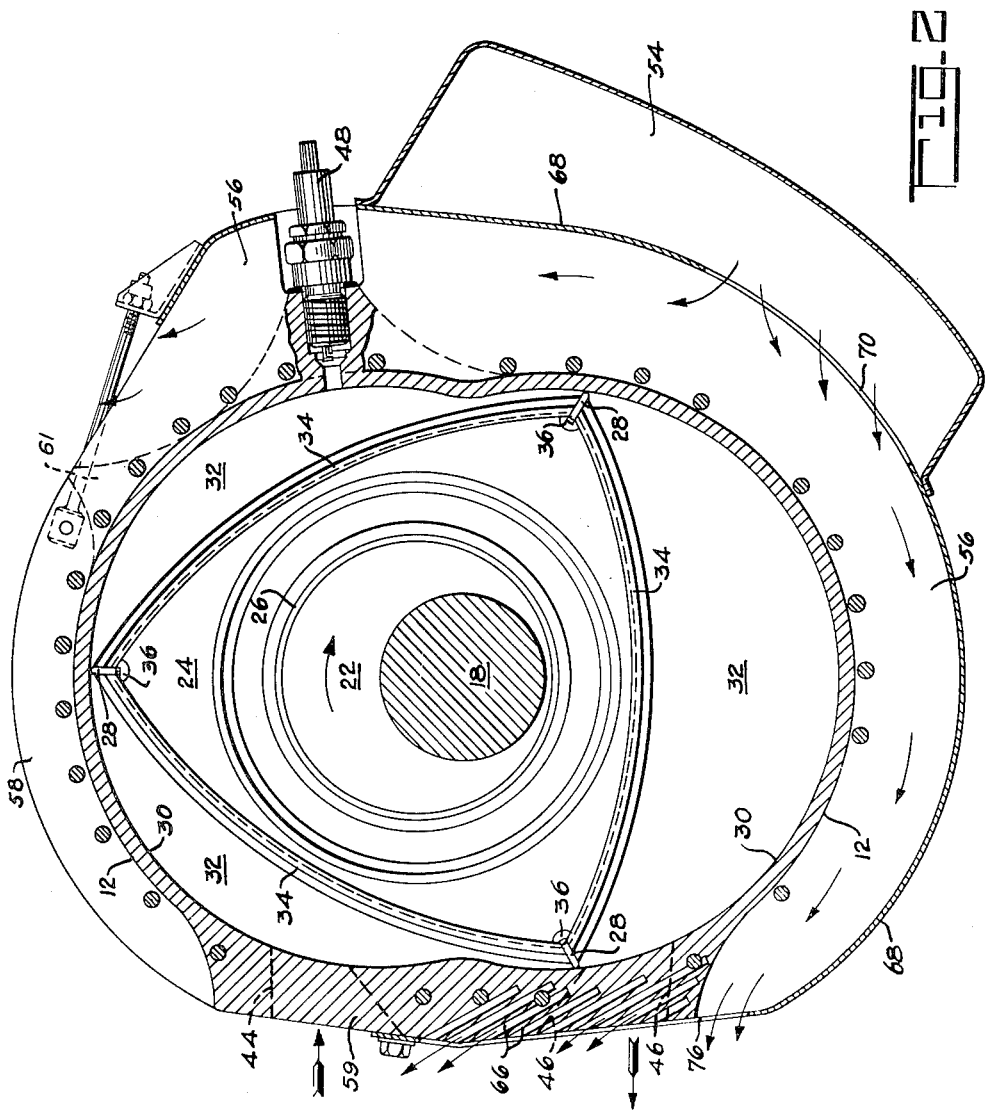

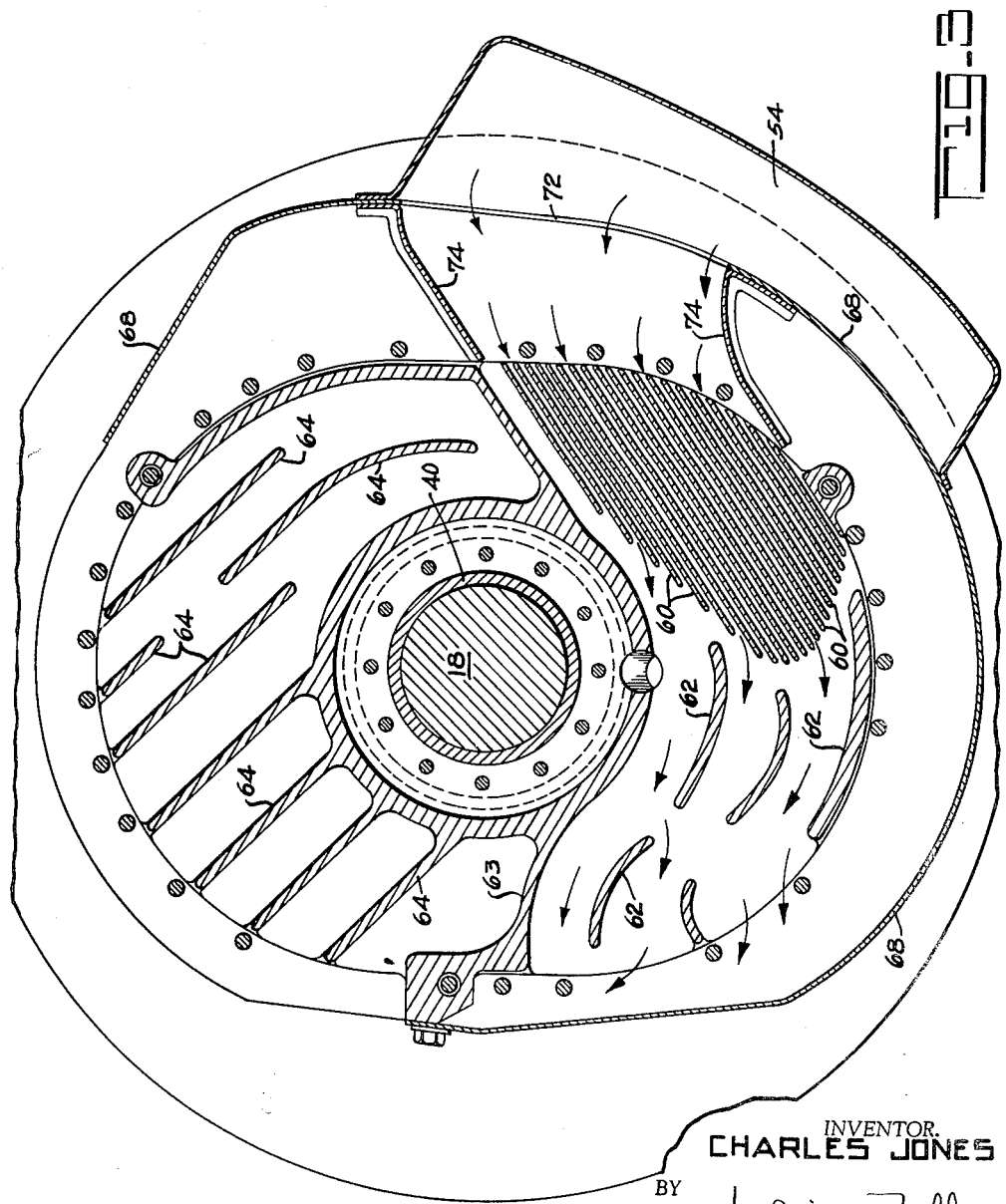

July 27, 1965 C. JONES 3,196,855
AIR COOLING SYSTEM FOR ROTARY COMBUSTION ENGINE
Filed Dec. 9, 1964 5 Sheets-Sheet 4
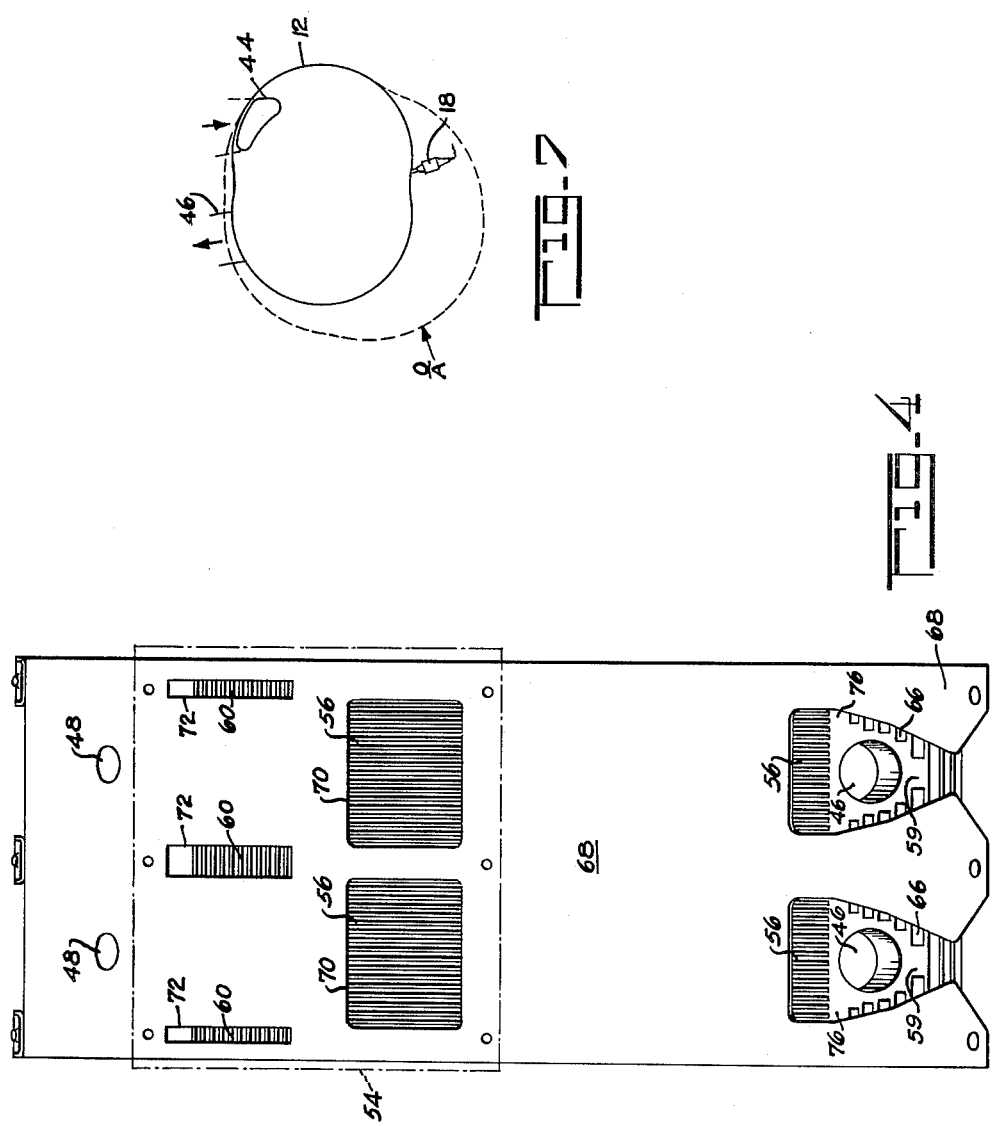
INVENTOR.
CHARLES JONES
BY
ATTORNEY July 27, 1965 C. JONES 3,196,855
AIR COOLING SYSTEM FOR ROTARY COMBUSTION ENGINE
Filed Dec. 9, 1964 5 Sheets-Sheet 5
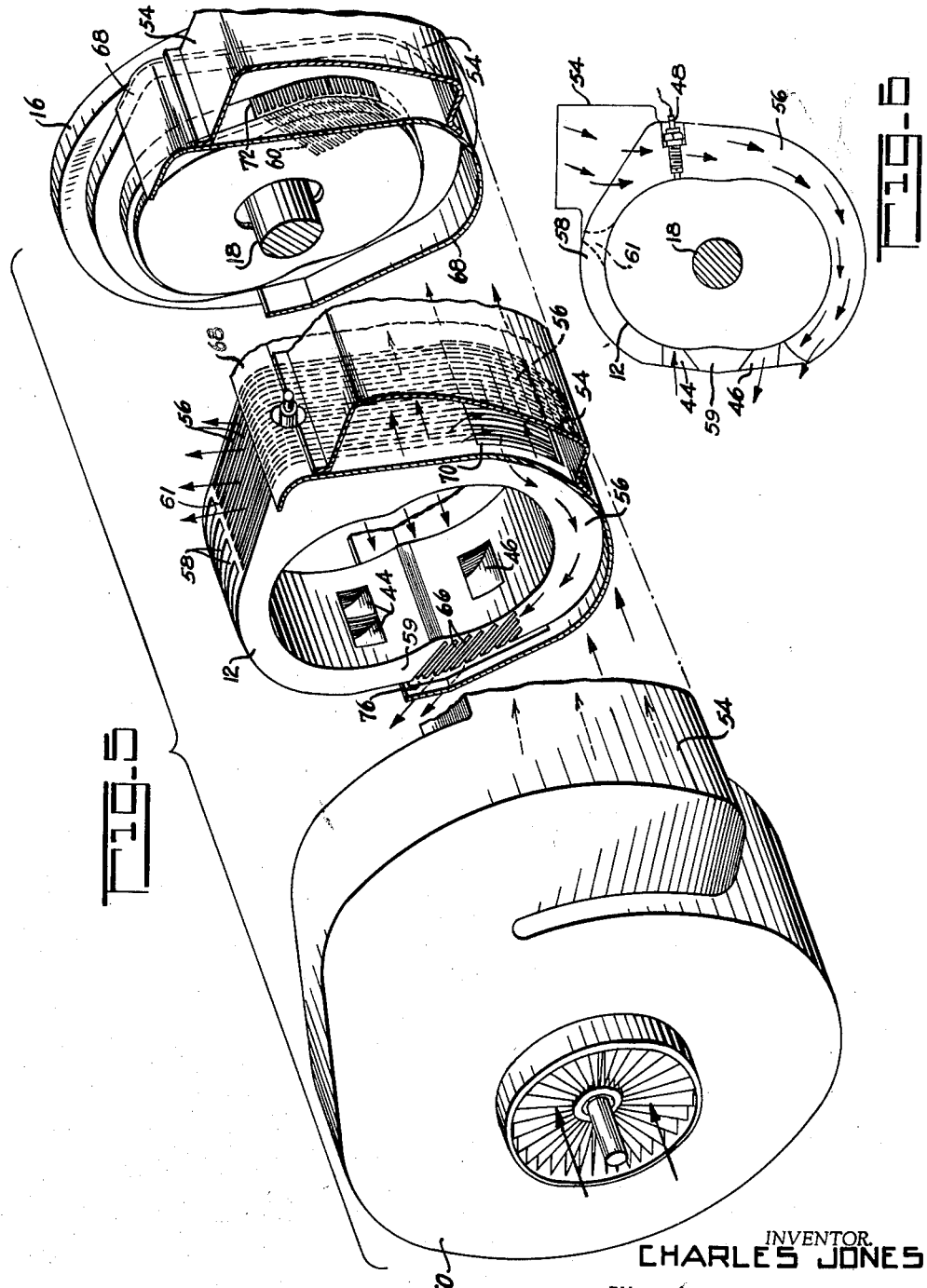
INVENTOR.
CHARLES JONES
BY
ATTORNEY 3,196,855
AIR COOLING SYSTEM FOR ROTARY
COMBUSTION ENGINE
Charles Jones, Paramus, N.J., assignor to Curtiss-Wright
Corporation, a corporation of Delaware
Filed Dec. 9, 1964, Ser. No. 417,106
2 Claims. (Cl. 123—8)

This application is a continuation in part of my application Serial No. 225,316, filed September 21, 1962.

This invention relates to rotary combustion engines and in particular to means for air cooling said engine. A rotary combustion engine as described herein may be of the type clearly disclosed in United States Patent 2,988,065, issued to Felix Wankel et al.

In general engines of this type comprise an outer body composed of a peripheral wall interconnected with a pair of end walls to form a cavity therein whose peripheral wall inner surface has a profile which preferably is basically an epitrochoid. A rotary is rotatably supported on a shaft within the cavity and has a plurality of circumferentially-spaced apex portions for sealing engagement with the inner surface of the peripheral wall thereby forming working chambers which upon relative rotation of the outer body and rotor vary in volume. An intake port is provided for admitting air or a fuel-air mixture, an exhaust port for expelling the burnt gases from said engine and an ignition means for igniting the fuel-air mixture whereupon the stages of intake, compression, expansion and exhaust may be carried out.

Considerable problems arise in attempting to cool an engine of the type described above, in particular when using air as the coolant. Since combustion and expansion always take place in the same relative positions in the engine outer body and because combustion takes place once for each complete revolution of the engine shaft, the outer body tends to have a high degree of heat flux produced in the region of combustion and expansion while in the region of the intake cycle little heating-up occurs so that there is a high variation about the engine axis in the heat input in the engine. The problem of air cooling a rotary combustion engine is more difficult than in reciprocating combustion engines because in reciprocating combustion engines the region of combustion and exhaust is also exposed to the intake stage which during alternate strokes of the piston aids in cooling down this area of the engine. In rotary combustion engines the intake cycle takes place in a region of the housing opposite to that of the region of combustion and the cool intake air normally cannot be used for cooling down the combustion and expansion regions. In addition, when providing the engine with an air cooling system, the system should have a high cooling efficiency in order that the horsepower drain on the engine in powering the cooling system be kept at a minimum.

The primary purpose of the invention is to provide an air cooling system for an engine of the type described above wherein substantial cooling is obtained and at the same time the drainage on the engine horsepower output in operating the cooling system is kept at a minimum. Broadly, the invention is carried out by providing a source of cooling air and introducing one portion of said air source radially to a circumferentially-extending cooling fin structure on the main rotor housing which guides the cooling air circumferentially around the heated zone of the engine, and introducing another portion to the end housings through which the cooling air passes and which is expelled from the engine in the region adjacent the engine exhaust port. The system is so designed that the pressure drops in all cooling paths within the circumferential fin structure are substantially the same and a minimum amount of the engine horsepower output need be used to efficiently operate the entire cooling system.

Accordingly it is one object of the invention to provide a novel and efficient cooling system for a rotary combustion engine.

It is another object of the invention to provide a circumferentially directed cooling air flow around the heated zone of a rotary combustion engine.

It is also an object of this invention to provide a novel cooling fin and supporting structure for the peripheral wall in a rotary combustion engine having nonuniform heat input which prevents distortion of said peripheral wall due to the hoop stresses generated during engine operation.

An additional object of the invention is to provide an efficient cooling system in a rotary combustion engine without significant draining of the engine horsepower output.

A further object of the invention is to provide a coolant system for a rotary combustion engine having localized high heat areas and for cooling the exhaust port and the exhaust gases discharging through said port.

Other objects and advantages of the invention will be apparent upon reading the following detailed description with the accompanying drawings in which:

FIG. 1 is a sectional view of a rotary combustion engine embodying the invention, FIG. 2 is a sectional view taken along line 2—2 of FIG. 1, FIG. 3 is a sectional view of an end housing taken along line 3—3 of FIG. 1, FIG. 4 is a development view of a portion of the housing structure of the rotary combustion engine of the invention showing the baffle plate overlying the cooling fin structure, FIG. 5 is an exploded perspective view of a portion of the rotary combustion engine shown in FIG. 1 and illustrating the air flow paths of the cooling system, the rotor having been removed for clarity of illustration, FIG. 6 is a diagrammatic view of a rotor housing illustrating another air flow system which may be utilized in the invention, and FIG. 7 is a diagrammatic view illustrating an example of the variation in degree of heat flux produced in a rotary combustion engine during operation.

Referring to the drawings, in FIG. 1 there is shown a multi-unit rotary combustion engine composed of two substantially identical rotary mechanisms. Of course, it should be understood at the outset that the invention may be embodied in a single rotary mechanism or in rotary combustion engines embodying more than two rotary mechanisms and the invention is not intended to be limited to a two unit engine. The two rotary mechanisms of FIG. 1, each generally designated 10, have their outer bodies formed by a main rotor housing or peripheral wall 12 and are interconnected at one end by a common end housing 14. An end housing 16 is connected at the outer ends of each rotor housing to enclose each rotary mechanism forming cavities therein. The main rotor housings are formed by the peripheral will 12 whose inner surface defines the shape of the cavity and has a profile which preferably is basically a two-lobed epitrochoid as shown in FIGS. 2 and 5. A shaft 18 is rotatably supported in the engine by suitable bearings 20 and has a pair of oppositely directed eccentric portions 22 formed thereon upon each of which there is rotatably supported a rotor 24 by a suitable bearing 26.

As shown in FIGS. 1 and 2, the rotors 24 each have three-circumferentially-spaced apex portions in each of which there is mounted a seal strip 28 for sealing engagement with the inner surface 30 of the peripheral wall 18 thereby forming working chambers 32 which upon relative rotation of the rotor 24 and the outer body 10 vary in volume. Side seals 34 mounted in the side faces of each rotor 24 mate with intermediate seal bodies 36 to provide a continuous seal between the respective chambers 32 thereby preventing any leakage between said chambers. An internally-toothed gear 38 (FIG. 1) is suitably secured to each of the rotors 24 and meshes with an externally-toothed gear 40 to guide the rotor in tracing its epitrochoidal path. Each external gear 40 has an extending sleeve portion which surrounds shaft 18, forming a supporting bearing surface for said shaft, and is secured to its respective end housing by suitable means such as bolts 42.

Each of the rotary mechanisms 10 has an intake port 44 (see FIG. 2) for admitting air or a fuel-air mixture, an exhaust port 46, for expelling the burnt gases from the engine and may be provided with an ignition means 48 so that during engine operation the stages of intake, compression, expansion, and exhaust may be carried out. Of course, if the engine is operated on the diesel cycle, the ignition means 48 may be eliminated.

In order to provide efficient air-cooling for rotary combustion engines of the type described above it is necessary to provide a sufficient volume of cooling air so that enough heat can be carried away to satisfactorily reduce the overall temperature of the engine during operation. However, supplying a large volume of cooling air normally requires a considerable drain on the horsepower output of the engine since the engine output normally must also be used to power the cooling fan. If the cooling air velocity is too low in one area of its path, it may not effectively cool this region and also may become too overheated to effectively cool adjacent regions. On the other hand, however, too high a velocity very rapidly increases the pressure drop and if large pressure drops are present in the system additional cooling fan power must be provided to overcome these pressure drops. Another important factor to be taken into consideration is the length of the cooling path since it is important that the cooling path is not too long so that the cooling air does not become too heated up in the early regions of its cooling path and so remains sufficiently cool to absorb heat at the regions adjacent the cooling path exit.

The horsepower needed to cool an engine with air is directly proportional to the product of the cooling air volume flow and the pressure drop in the system. As is known in air cooling internal combustion engines, the volume of air needed to cool the engine is in part dependent upon the air velocity, which can be readily calculated for a given engine structure and in part upon the area of the cooling air flow path. The flow path may be defined as the total cross-sectional area of the cooling air passage normal to the direction of flow. The ideal situation is to have one flow path around the heated-up area thereby using a minimum volume of air since a minimum flow path area is to be traversed. It has been found, however, in cooling the rotor housing of rotary combustion engines having a relatively high output where a great deal of heat is generated, it is not always satisfactory to introduce cooling air at one end of a single flow path and guide it around the entire heated-up area of the engine. This is because the change in temperature of the cooling air from the input area to the output area is too great to adequately cool the heated region adjacent the output area. This system is quite satisfactory for lower output engines, however, where less heat is generated as will be further discussed below.

According to the present invention, when cooling the rotor housing of a relatively high output engine, the cooling air is introduced at an intermediate position of the cooling fin area and split into two circumferential flow paths which flow in opposite directions around the heated-up area of the engine. By this means the same total heat transfer surface can be traversed as in the above-mentioned ideal situation but the change in temperature for each flow path is less since less heated area is traversed by each flow path than in the case of one flow path. Therefore, since the total flow path is kept at a minimum, the volume flow of air needed to operate the cooling system does not exceed practical levels. It has been found that the horsepower needed to operate the cooling system of the present invention is in the neighborhood of 7.5% of the total output which is well within the limits of air cooling systems presently used in internal combustion engines.

Additional means for lowering the volume flow of air needed to adequately cool the engine may be carried out by reducing the velocity of flow of the cooling air thus reducing the pressure drop in certain areas of the system. As stated above, pressure drops in the system require that the volume flow be increased in order to keep the air moving in these areas so the heat can be removed. One means for reducing the required pressure drop may be provided by reducing the height of the cooling fin area in the regions where lesser heat is produced and removing some of the fins in these areas or alternatively increasing the overall fin height in these areas.

For the purpose of supplying cooling air to the engine, a suitable blower, generally designated at 50, for example a centrifugal-type blower is mounted on one end of the engine (FIG. 1) and may have suitable gearing diagrammatically illustrated by phantom lines at 52, for permitting the fan to run at speeds other than that of the engine shaft. A cooling air duct 54 (FIGS. 2, 3 and 5) is connected to an outlet of the blower 50 and runs axially along the length of the engine terminating at an end housing at the opposite end of the engine from the blower 50. The duct 54 is provided with outlets so as to radially direct the cooling air from the blower duct to the engine cooling fin area as will be further explained below.

As illustrated, circumferential extending cooling fins 56 are provided on the peripheral wall 12 of each rotary mechanism and are spaced axially across the entire width of the outer surface of the peripheral wall 12 which itself preferably extends substantially beyond the width of the rotor 24 in order to provide the maximum possible cooling surface.

As shown in FIG. 2, the fins 56 extend circumferentially only around the relatively hot portion of the peripheral wall 12. Structural reinforcing ribs 58 are provided in the relatively cool portion of the peripheral wall 12 and join at each of their circumferential ends, respectively, interconnecting body portions 59 and 61, which project radially outwardly from the outer periphery of said peripheral wall to a radial distance substantially equal to the radial projection of said ribs 58 and fins 56. It will also be seen that the fine fins 56 also join the interconnecting body portions 59 and 61 at each of their respective circumferential ends so that the fins 56, the ribs 58 and the interconnecting body portions 59 and 61 form a substantially hoop-like structure or substantially continuous bands around the outer periphery of the peripheral wall 12. Through this construction, hoop stresses which are generated during operation are prevented from distorting the shape of the peripheral wall and said peripheral wall will therefore be maintained substantially rigid during operation. In absence of the supporting structure including the combination of the fine fins 56 in the hot portion and a supporting structure such as the ribs 58 in the relatively cool portion, the nonuniform heat input to the peripheral wall and the hoop stresses generated would cause the housing to distort and thus be detrimental to the performance of the engine. However, as stated above the novel construction of the invention maintains the peripheral wall substantially rigid and eliminates the problem of distortion.

FIG. 7 diagrammatically illustrates the variation in heat flux produced in a rotary combustion engine, shown therein by dotted lines and indicated by the proportion $Q/A$. It can be seen therein that the greatest heat flux is produced in the region of combustion and expansion which, as stated above, is the region in which the cooling fin structure is provided. The axial spacing of cooling fins 56 is very small preferably being in the neighborhood of .050″ although the spacing may range from approximately .030″ to approximately .080″ depending upon the output of the engine and the degree of cooling desired. The thickness of the fins is also preferably .050″ but may also range from approximately .030″ to approximately .080″. Theoretically the thickness and spacing of the fins could range from .010″ to beyond .080″ but for manufacturing purposes and because the fins must be relatively strong the most practical limits have been found to between .030″ to .080″ although it is not intended that the invention be limited to the above-mentioned ranges. The spacing of the fins used in the present invention gives the overall fin structure substantially the characteristics of a uniform band around the heated-up area of the housing and therefore aids in supporting the relatively thin peripheral wall and in keeping it rigid during operation and also the small spacing and small fin thickness provides for a large number of cooling passages and cooling fin area which is desirable for better heat transfer.

FIG. 3 shows a sectional view of one of the end housings 16 whose cooling fin structure is substantially identical to that of the common end housing 14 and may serve for purposes of description to illustrate the cross section of the fin structure of both of said housings. In the area of the end housings 14 and 16, the cooling air from duct 54 is directed radially inward through the housings instead of being directed circumferentially around the housings as in the case of the rotor housing 12, so that the cooling air is routed directly to where it is needed most for aiding in cooling the axial ends of the rotor housings 12 and end housings 16 and 16 in their relatively highly heated regions. Axially extending, radially-spaced cooling fins 60 provide sufficient heat transfer surface area for cooling the regions of maximum heat flux and along with guide vanes 62 are angularly directed so as to also aid in guiding the incoming radially directed air from duct 54 through the housing on its combustion and expansion side. Baffle plates 63 are also provided to confine the flow of cooling air to the hot side of the end housings. Ribs 64 are provided in other regions of the housing, for example in the region bordering the intake port, in order to provide support for the end walls of the housings 14 and 16. Surrounding the exhaust port 46 are slotted passages 66 formed in the peripheral wall 12 and which provide a plurality of cooling passages through which some of the air leaving the end and intermediate housing may flow to further aid in cooling the exhaust port area and the gases flowing out of the exhaust port 46, which will be explained in greater detail below.

The cooling air duct 54 extends across the engine housings parallel to the engine axis and a baffle plate 68 is secured to the duct on its engine side by suitable bolts or other suitable means. The baffle plate 68 extends in a circumferential direction and wraps around the relatively highly heated portion of the engine housing from a region circumferentially beyond the ignition means 48 in one direction to a region beyond the exhaust port 46 in the other direction as shown in FIGS. 1 to 5. As shown in FIGS. 2 and 5 in particular, the baffle plate 68 covers a major portion of the cooling fin area on the peripheral wall thereby defining a plurality of enclosed passageways for guiding the cooling air around the heated-up areas of the housings. In order that the cooling air may pass from the cooling duct 54 to the cooling fins 56, an opening 70 in the baffle plate 68 is provided for each unit of the two unit rotary engine. Each opening 70 provides for flow of cooling air from the duct 54 into the passages between the cooling fins 56 of the associated rotary engine unit and is positioned with respect to fins 56 so that the cooling air passing through the opening 70 from duct 54 will be split into two oppositely directed circumferential cooling paths, as shown by the arrows in FIGS. 2 and 5 which diagrammatically illustrate the direction of flow of the cooling air.

Because of the fact that the end housings have no cooling fins on their outer surface, the baffle plate 68 as spaced a short distance from the end housings and in order that the cooling air may be directed from the duct 54 to the radially-spaced cooling fins 60 in the end housings an opening 72 is provided in the baffle plate 62 adjacent to the entrance of cooling fins 60 and guide plates 74 are suitably mounted on the inner surface of the baffle plate 68 and extend from the opening 72 to the end housings 14 and 16 at the entrance of the cooling fin area. When the engine is assembled, the housings on either side of the end housings 14 and 16, abut against the guide plates 74 and the outer cooling fins on said housings to form a closed passageway leading from the baffle plate 68 to the end housings 14 and 16 thus ensuring that the cooling air will be directed from the duct 54 into the cooling fins 60. As further shown in FIGS. 3 to 5, the baffle plate 68 extends beyond the exit area for the cooling air from the end housings 14 and 16 thereby forming a spaced covering over said exit area. Therefore, the cooling air leaving these housings will strike against the baffle plate and will be diverted away from the exit area. This diverted air will be directed substantially sideways or in substantially axial direction toward the adjacent rotor housings where it may enter the slotted passages 66 formed around the exhaust port thereby aiding in cooling the exhaust region of the rotor housings. As shown in FIGS. 4 and 5, the baffle plate 68 extends circumferentially beyond the exhaust port 46 on the rotor housing and has an opening 76 provided therein which overlies the exhaust port to allow the exhaust gases and the cooling air to flow through the baffle plate and out of the engine.

FIG. 5 diagrammatically illustrates the cooling air flow paths for a relatively high horsepower output engine of the type described above wherein large amounts of heat will be generated over a large area during operation. As can be seen therein, the cooling air, shown by the arrows, is pulled in by the blower 50 from outside the engine and is circulated circumferentially around the blower. The air is then forced out into duct 54 where it flows in an axial direction along the length of the engine. The length of the duct 54 of course depends on the number of rotary mechanism units employed in the engine and the system is designed so that cooling air will be transported to each rotary mechanism 10 by the duct 54. The duct 54 opens to the engine in a direction substantially perpendicular to the circumferentially extending cooling fins 56 through the baffle openings 70. The duct extends across each engine housing unit in a region which is intermediate of the ends of the highly heated region of the housing unit and is positioned such that the cooling air radially introduced to the circumferential fins will flow in two paths around the engine and each path will have a pressure drop which will be substantially the same. It has been found that the preferred location of the duct is such that its center is spaced from the minor axis portion of the peripheral wall adjacent the ignition means in the direction of rotor rotation, as seen in FIG. 2, or, as more commonly referred to, the top dead center (TDC) position. However, the outlet location is not restricted to this area and may vary according to the particular fin arrangement and cooling requirements. The circumferential cooling air is therefore split into two paths, one of which flows around the rotary mechanism in a direction opposite that of rotor rotation and exhausts from the cooling fin passages slightly beyond the ignition means 48, and the other of which flows around the rotary mechanism in the direction of rotor rotation where it then leaves the cooling fin area and is exhausted from the engine through the baffle plate openining 76 over the exhaust region along with the exhaust gases from combustion and thereby also serves to cool down the exhaust gases. A third path of cooling air flows from the duct 54 and is directed radially through the cooling fins provided in the end housings and, as stated above, this cooling air is also expelled from the engine through the baffle plate opening 76.

Thus, it can be seen that cooling air is directed to the heated-up regions of the rotary combustion engine and that a minimum quantity of cooling air need be utilized. By keeping the individual flow path areas small and taking into account the pressure drops in the system the volume of air needed to satisfactorily cool the engine can be kept at a minimum and therefore a large horsepower drain on the engine output is prevented. Further, by splitting the total circumferentially directed flow path into two separate cooling paths in each rotary mechanism, the cooling air does not become too greatly heated-up before it reaches the end of its paths so that the region adjacent the ends of each circumferential cooling path may be satisfactorily cooled.

In engines having a lower horsepower output wherein less heat is generated than in the cases of engines of the type referred to above, or those wherein the heat flux is relatively concentrated at localized peaks, the cooling air may be directed circumferentially around the rotor housing as diagrammatically illustrated in FIG. 6. As shown therein, the circumferentially directed cooling air is radially introduced from duct 54 at one end of the circumferentially cooling fins 50, preferably the end intermediate of the ignition means 48 and intake means 44 instead of at a position intermediate the ends of the cooling fins 56, as described above. The cooling air then flows circumferentially around the heated-up regions of the rotor housing in a single path and is expelled in the region of the exhaust port 46, as previously described. The cooling air for the intermediate and end housings is suitably directed through these housings from the duct outlet and is also exhausted in the region of the exhaust port 46, as in the case of the engines described above. Since less heat is generated in this type of engine, the cooling air will not become too heated up before reaching the end of its circumferential cooling path and the system will provide for satisfactory cooling. Of course, it should be realized that the split path system described with relation to relatively high output engines may also be used with engines having a relatively low output and also the single path system may be used in some applications of relatively high output engines.

From the above description it can be seen that a satisfactory and efficient air cooling system is provided for a rotary combustion engine, having specialized cooling problems due to the unique construction and heating-up characteristics present in this type of engine. The novel combination of fine cooling fins and supporting structure in the relatively hot and cool portions, respectively, of the peripheral wall serves to maintain the housing substantially rigid even in view of the nonuniform heat input characteristics of this type of engine and the stresses produced during operation.

While the invention has been set forth in detail in the above description, it should be understood that the invention is not to be limited by the specific detail set forth therein and various changes and modifications may be made by those skilled in the art without departing from the spirit and scope of the invention as defined in the following claims. For example, the supporting rib structure in the relatively cool portion of the peripheral wall may take another form other than that illustrated in the preferred embodiment.

I claim:
1. In a rotary combustion engine, an outer body having a peripheral wall interconnected with a pair of end walls the radially inner surface of said peripheral wall and the axially confronting faces of said end walls forming a cavity disposed about an axis, intake means in one region of said outer body communicating with the inner surface of said peripheral wall, a combustion zone in another region of said outer body and exhaust means for discharging the gases produced in said combustion zone through said outer body, said outer body having a relatively hot sector in one region and a relatively cool sector in another region with said regions being circumferentially spaced such that said outer body is subjected to nonuniform thermal stresses around its periphery, a plurality of fine fins projecting from the outer periphery of said peripheral wall, said fine fins being normal to and closely spaced along an axis parallel to said outer body axis and extending circumferentially around the relatively hot sector of said peripheral wall, a plurality of supporting ribs projecting from the outer periphery of said peripheral wall, said supporting ribs being disposed normal to and spaced substantially wider than said fine fins along an axis parallel to said outer body axis and extending circumferentially around the relatively cool sector of said peripheral wall, baffle means covering and sealing only said fine fins to form a plurality of closed individual cooling passages between said fine fins with said cooling passages having open ends at each end of said relatively hot sector, said baffle means having an opening at one circumferential end of said fine fins for supplying cooling air to said cooling passages and an opening at the other circumferential end of said cooling fins for discharging the cooling air from said cooling passages, and interconnecting body wall portions projecting from the outer periphery of said peripheral wall to a radial distance substantially equal to the radial projection of said ribs and fins, said interconnecting body wall portions joining the circumferential ends of said fine fins and supporting ribs thereby forming a substantially rigid hoop-like supporting structure around said peripheral wall for preventing distortion of said peripheral wall in the circumferential direction from the nonuniform thermal stresses generated during engine operation.

2. In a rotary combustion engine as recited in claim 1 wherein said supporting ribs extend circumferentially around the relatively cool sector from said intake means to adjacent to said combustion zone.

References Cited by the Examiner

UNITED STATES PATENTS

| 885,006   | 4/08  | Bames.      |          |
|-----------|-------|-------------|----------|
| 1,003,800 | 9/11  | Rodigen.    |          |
| 1,024,166 | 4/12  | Weed        | 123—11   |
| 1,095,730 | 5/14  | Jacklin.    |          |
| 1,386,792 | 8/21  | Needham     | 230—210  |
| 1,568,242 | 1/26  | Rockefort.  |          |
| 1,712,945 | 5/29  | Thannhauser.|          |
| 2,856,753 | 10/58 | Herzog.     |          |
| 2,876,948 | 3/59  | Hockel et al. | 230—211 |
| 2,988,065 | 6/61  | Wankel et al. | 123—8  |
| 3,014,639 | 12/61 | Boli        | 230—211  |
| 3,069,071 | 12/62 | Carlson     | 230—211  |
| 3,102,516 | 9/63  | Gist et al. |          |

FOREIGN PATENTS 335,735   10/30  Great Britain.

KARL J. ALBRECHT, *Primary Examiner.*